United States Patent Office 3,502,204
Patented Mar. 24, 1970

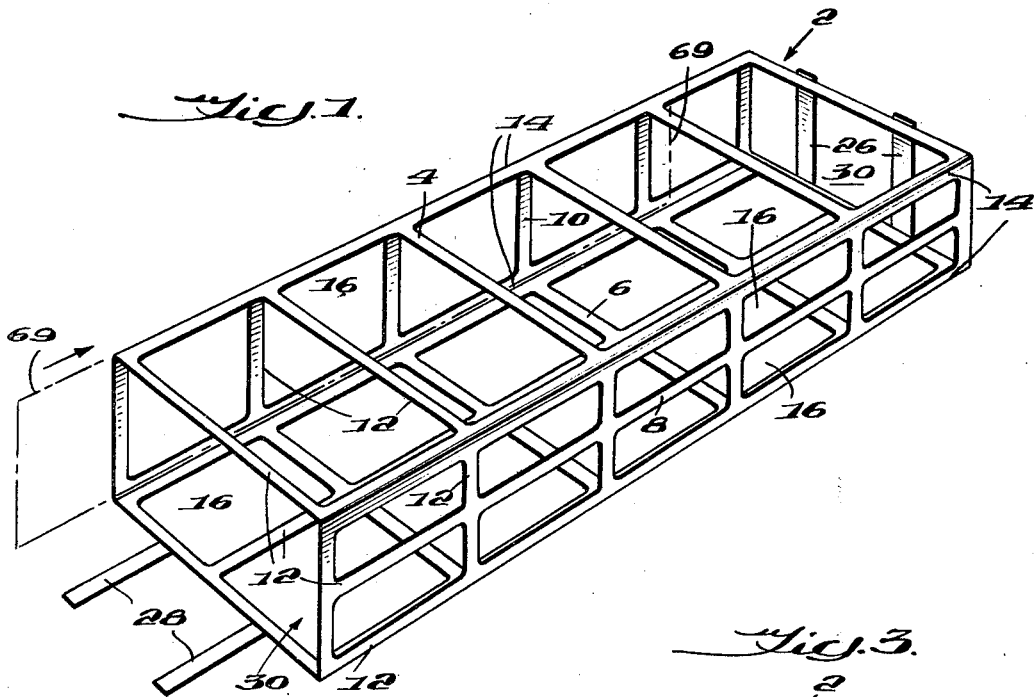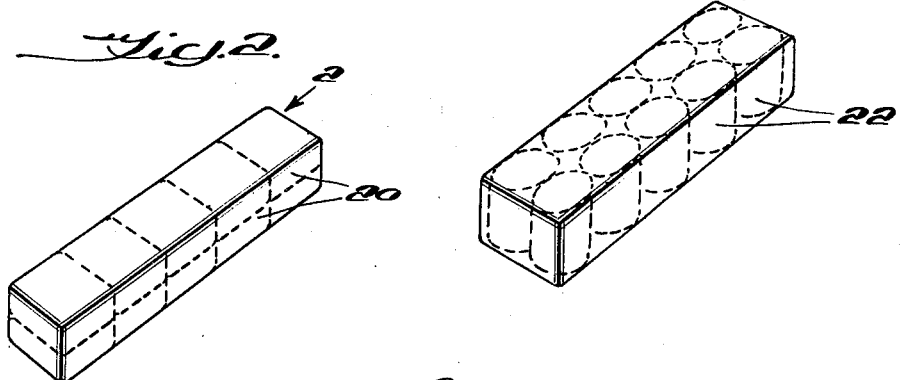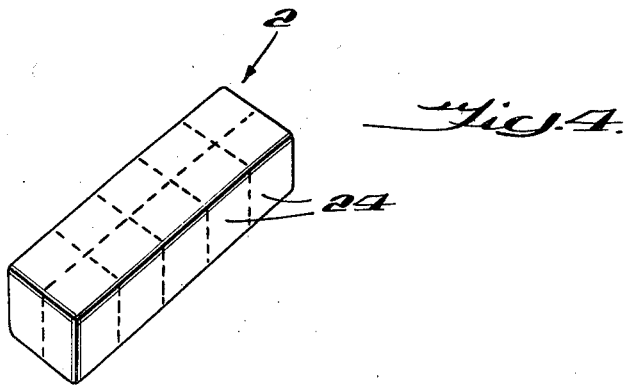

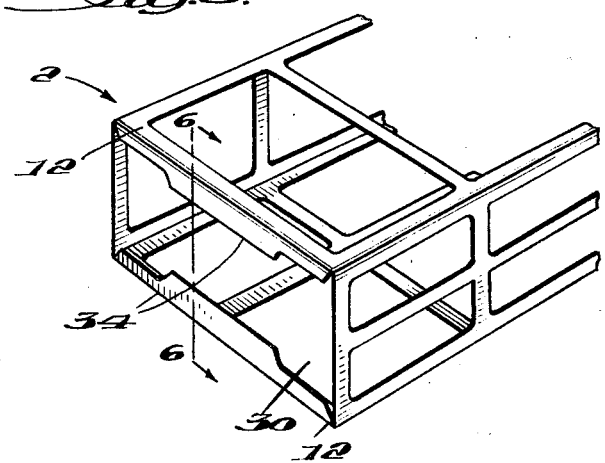
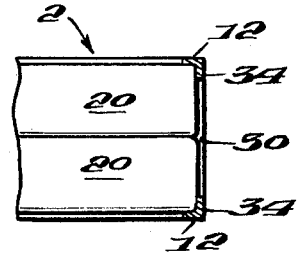
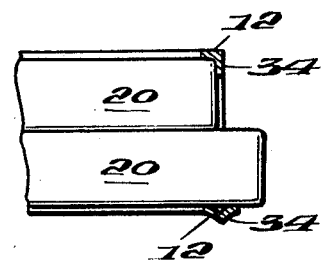
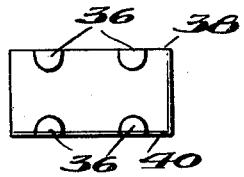
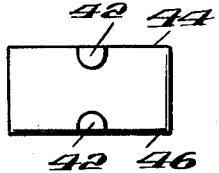
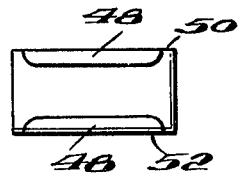
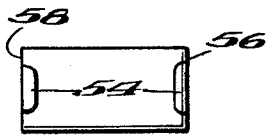
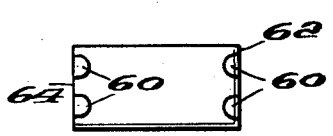

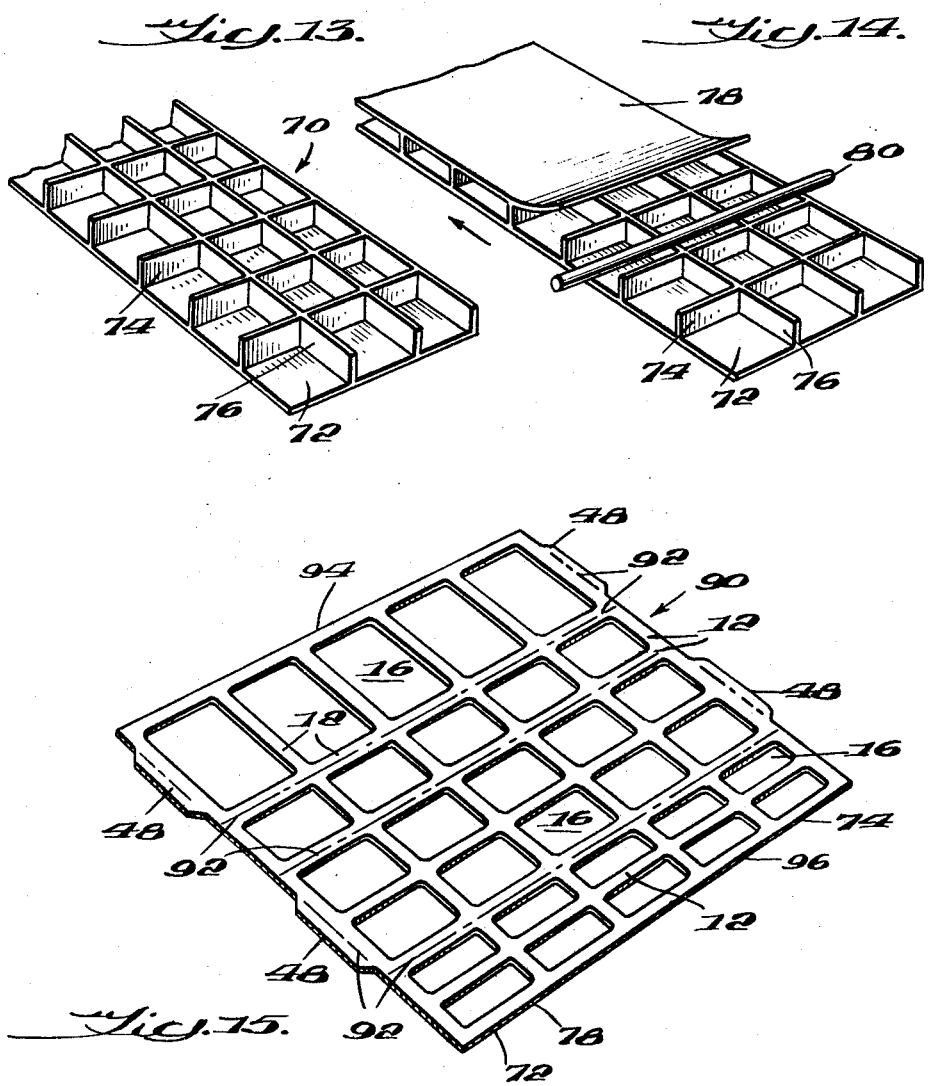

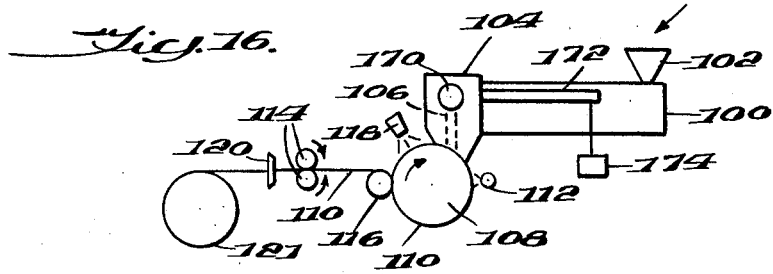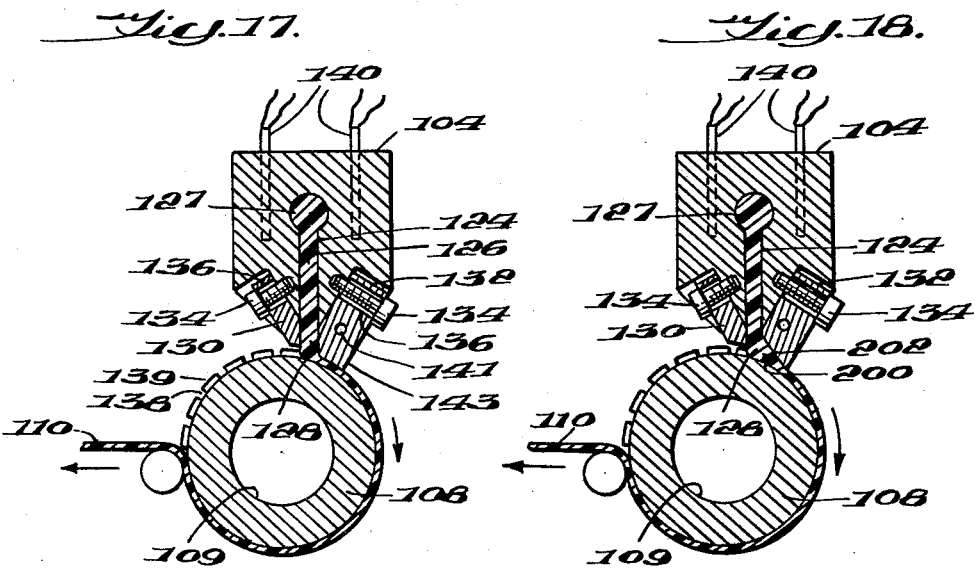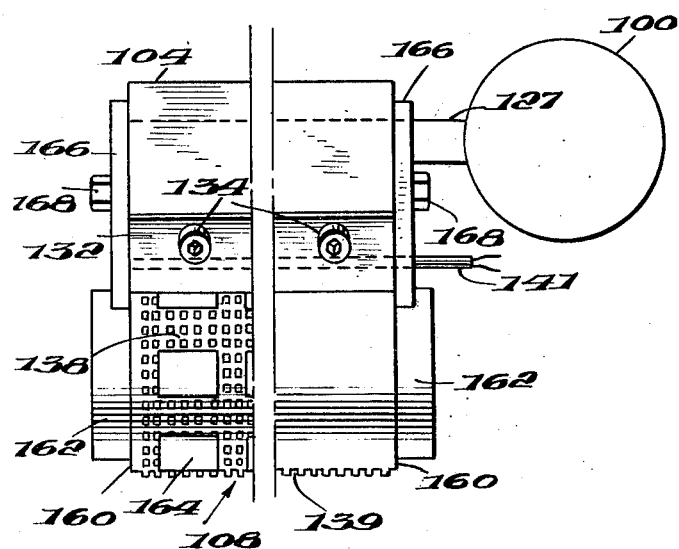

3,502,204
CONTAINERS MADE FROM STRIPS OF THERMOPLASTIC RESIN FILM HAVING A NETWORK OF RIBS MOLDED TO A SURFACE OF THE FILM
David D. James, North Hills, Wilmington, Del., assignor to E. I. du Pont de Nemours and Company, Wilmington, Del., a corporation of Delaware
Continuation-in-part of application Ser. No. 560,001, June 23, 1966. This application July 18, 1968, Ser. No. 756,698
Int. Cl. B65d 25/00
U.S. Cl. 206—45.34    6 Claims

ABSTRACT OF THE DISCLOSURE

A container is made from strips of film having a network of ribs integrally molded to a surface of the film, with the strips forming a self-sustaining framework thereby forming a container. The ribs enable the film to retain integrity by preventing the propagation of ters therethrough.

---

This application is a continuation-in-part of parent application Ser. No. 560,001, filed June 23, 1966, by the same inventor and now abandoned.

This invention relates to improvements in containers for packaging articles.

While plastics have better properties, such as moisture insensitivity and durability, than do paper-based packaging materials such as boxboard, paperboard and fiberboard, plastics have received limited usage as containers, e.g., cartons, because of their relatively high cost.

The present invention provides economical containers of plastics, the containers being in the form of a self-sustaining framework composed of integrally molded intersecting strips of thermoplastic resin. The intersecting strips define apertures which comprise a major proportion, i.e., greater than 50 percent, and preferably greater than 65 percent, of the total area of the container. The container is formed from a container blank in which the apertures are formed either during the molding of the blank or are cut from a solid web of thermoplastic resin and the cut-out material recycled to the molding process. The apertures in the containers of this invention lead to economies which are not obtainable with paper-based packaging materials since paper-based packaging materials are normally made in the form of imperforate sheet stock, rather than apertured stock, and material cut-out from this stock is not economically recycled. The resistance to tear propagation of thermoplastic resin relative to that for paper-based packaging materials leads to containers of the present invention which require a minimum of material but nevertheless which are strong and functional. The large apertured area of the containers of this invention give maximum exposure of the contents, including the wrappings, such as cellophane and/or printed paper thereof.

In another embodiment of the present invention, the containers are provided with durable flexible tabs extending into the opening of the container, which tabs can be flexed to permit repeated withdrawal of articles from the container or insertion of articles into the container and which can retain articles within the container until withdrawal is desired.

Another embodiment for containers of this invention is the use of lap-free construction which saves material normally required in overlaps. Material savings are also obtained by still another embodiment in which the integrally molded intersecting strips are composed of a ribbed structure comprising a film and a network of ribs integrally molded to a surface of the film and to each other.

This construction when applied to the tabs of the foregoing mentioned embodiment makes the tabs rigid to enable them to perform their holding function and yet flexible enough for article withdrawing purposes.

These and other embodiments of the present invention will be more fully discussed hereinafter with reference to the accompanying drawings, in which:

FIG. 1 is a perspective view of a container incorporating features of the present invention;

FIGS. 2, 3 and 4 are each a perspective view of the container of FIG. 1, but shown in solid outline only and containing articles of various shapes;

FIG. 5 is a perspective view of one end of another embodiment of a container of the present invention;

FIG. 6 is a section taken along the line 6—6 of FIG. 5 and shows articles within the container being retained by flexible tabs;

FIG. 7 shows the removal of one of the packages of the container of FIG. 6;

FIGS. 8, 9, 10, 11 and 12 show an end view of a container of the present invention incorporating different embodiments of flexible tabs;

FIG. 13 shows an enlarged view of a ribbed structure from which the integrally molded intersecting strips forming containers of the present invention can be made;

FIG. 14 shows another embodiment of ribbed structure and method for manufacturing same;

FIG. 15 shows a container blank such as can be made from the ribbed structure of FIG. 14 and which can be erected into a container similar to that shown in FIG. 1;

FIG. 16 shows diagramatically apparatus for making ribbed structure such as of FIG. 13;

FIG. 17 shows in cross-section one embodiment of molding apparatus for use in the apparatus of FIG. 16;

FIG. 18 shows in cross-section another embodiment of apparatus for use in the apparatus of FIG. 16; and FIG. 19 shows an embodiment for laterally confining molten thermoplastic resin, and, in indeterminate width, an embodiment of a roll pattern for making a continuous web of container blank stock.

Referring now to the drawings, FIG. 1 shows a carton or container 2 in the form of a framework having plurality of faces, viz., a top face 4, a bottom face 6, a front face 8, and a rear face 10, each face consisting of integrally molded intersecting strips 12 of thermoplastic resin. Generally, the strips have a cross-sectional thickness which is less than one-third of the width thereof and have a length which is substantially greater than the width of te cross-section. Integrally molded means molded as a unit from contacting masses of molten thermoplastic resin rather than molded into strips from separate masses of molten resin which are then brought together and heat bonded. The faces 4, 6, 8 and 10 are joined to one another along sharp creases 14. The intersecting strips 12 have sufficient thickness that the framework obtained therefrom is self-sustaining, i.e., it will maintain its erected shape such as shown for container 2. The container has at least one longitudinal joint, usually corresponding to a crease 14.

The integrally molded intersecting strips 12 define apertures 16 in each of the faces of the container. The use of thermoplastic resin to make the container enables the area of apertures 16 to comprise a major proportion of the total area of the container inclusive of the ends thereof, and preferably at least 65 percent of this total area and yet to yield a container which is strong and can form a tight package with the articles contained therein.

The particular pattern of the intersecting strips 12 will depend on the articles being packaged. For illustrative purposes, container 2 of FIG. 1 is shown with different patterns of intersecting strips in opposite faces. In top face 4, the apertures 16 extend entirely transversely across the face, while in bottom face 6, the apertures 16 extend only half way across the face and are separated by a longitudinal strip 12. Similarly, in front face 8, the apertures 16 extend only about half way across the face, while in back face 10, the apertures 16 extend entirely across the face. The apertures need only be sufficiently narrow to prevent passage of the articles to be packaged by the container from passing through the apertures. Normally, for ease of manufacture, opposite faces of the container will have the same pattern of strips instead of the different patterns shown in FIG. 1.

FIGS. 2, 3 and 4 show illustrative shapes of articles that can be packaged in container 2. In FIG. 2 the articles are shown in dotted lines (the container 2 is shown as a solid outline only) in the form of horizontally positioned rectangular solid shapes 20 which could be such articles as soap or cigarette packages. The wrappings on these individual shapes 20 are visible on all sides of the container through the apertures 16. When the shapes 20 are cigarette packages, the apertures 16 in either the front face 8 or back face 10 of the container 2 enable the packages to be tax-stamped without removal from or opening of the container 2. In FIG. 3, the articles within container 2 are in the form of upstanding cylinders 22 such as cans. In FIG. 4, the articles are in the shape of upstanding rectangular shapes 24 such as cereal cartons.

Referring back to FIG. 1, the ends or article access openings 30 of container 2 can be sealed by various means such as by a pair of end-strips 26 of thermoplastic material adhesively secured or heat bonded at their ends to the terminal or end-most strips 12 of the top and bottom faces at one end of the container. At the opposite end of container 2, a second pair of end-strips 28 are adhesively secured or heat-bonded at one end to the terminal strip of bottom face 6. After filling container 2 with articles such as 20, 22 or 24 of FIGS. 2-4, the end-strips 28 are secured at their free end to the terminal strip 12 of the upper face 4 of the container. Optionally, securement of the strips 28 to the top and bottom faces of the container can be done after the container is filled. Instead of running from top to bottom face of the container, the end-strips such as 26 and 28 can run from back face to front face or on the diagonal from back and front face to top and bottom face, respectively.

Another embodiment for retaining articles within the container 2 is shown in FIG. 5, in which tabs 34 of thermoplastic resin extend substantially at right angles from the terminal strips 12 and into the article access opening 30 at the end of the container. The tabs 34 can either be formed integrally with the terminal strips 12 of the top and bottom faces of the container 2 or can be formed separately and either heat bonded or adhesively secured to these terminal strips. Operation of the tabs 34 is shown in FIGS. 6 and 7. In FIG. 6, cigarette packages 20 lie between the terminal strips 12 and abut tabs 34 extending from each strip across the opening 30 of the container. One of the packages 20 can be gripped from each end thereof through apertures 16 of the container 2 and withdrawn through the opening 30, whereupon the corresponding tab 34 flexes outwardly to permit this withdrawal. This outward flexure is also accompanied by some outward deflection of its anchoring strip 12 out of the plane of the corresponding face of the container. The other flexible tab 34 remains in place to retain the other cigarette package 20. The tabs 34 can be used at each end of the container 2. The extent to which these tabs extend across the openings at these ends will depend on the particular articles being contained. Because the tabs are made of thermoplastic resin, they have sufficient resilience to return to their normal position of extending across the opening at the ends of the container to thereby prevent other articles from falling out of the container.

The flexible tabs usable in containers of the present invention can be in various forms such as illustrated in FIGS. 8 through 12. In FIG. 8, the tabs are in the form of two pairs of finger-like projections 36 secured, two each, to the top and bottom faces 38 and 40 of the container. This arrangement of tabs will permit removal of packages from one side of the container while packages along the other side will be retained therein. In FIG. 9, the tabs are in the form of a single pair of finger-like projections 42 secured, one each, to the top and bottom faces 44 and 46 of the container. In FIG. 10, the tabs 48 are in the form of flaps 44 which extend almost entirely across the top and bottom faces 50 and 52 of the container. In FIG. 11, the tabs are in the form of flaps 54 extending almost entirely across the front and back faces 56 and 58 of the container. In FIG. 12, the tabs are in the form of two pairs of finger-like projections 60 secured to the front and back faces 62 and 64 of the container. The various arrangements of tabs in FIGS. 5 and 8 through 12 are merely illustrative. These arrangements can be combined in any fashion so as to have combinations of tabs on all faces of the container and at each end of the container. In another embodiment of the invention, a display medium such as a card indicated by dashed line 69 can be inserted as indicated by the arrow between one of the container faces and the contents of the container for exhibiting additional advertising or promotional data or season's greetings.

The apertured containers of the present invention can be formed by injection molding, or blanked from a solid sheet of thermoplastic resin with the end sealing means being subsequently added to or formed from the molded container. Preferably, however, the container is made from a web of ribbed structure comprising a network of ribs integrally molded to each other and at least one film of thermoplastic resin integrally molded to one side of said network of ribs. As shown in FIG. 13, the ribbed structure 70 can consist of a continuous film 72 forming one surface of the structure and molded integrally therewith a network of ribs consisting of ribs 74 and 76 intersecting with one another to form a pattern of squares between the ribs. The intersections of the ribs 74 and 76 are also integrally molded.

The spacing between ribs and the film thickness of the ribbed structure 70 are generally coordinated to avoid buckling of the film when compressed by flexure of the ribbed structure. Generally, the ribs are spaced as far apart as possible to obtain low bulk densities, yet while avoiding film buckling. Bulk densities for the network of ribs and for the ribbed structure can be less than 20 percent and 30 percent, respectively, and preferably less than 12 percent and 20 percent, respectively, of the density of the resin from which the structure is made. Representative dimensions for ribbed structures which can be made by the process to be described hereinafter, are as follows, all dimensions being in inches:

| Width of Ribs | Height of Ribs | Spacing Between Ribs | Film Thickness |
| --- | --- | --- | --- |
| 0.004 | 0.025 | 0.073 | 0.0017 |
| 0.005 | 0.038 | 0.107 | 0.0025 |
| 0.006 | 0.056 | 0.150 | 0.0035 |
| 0.007 | 0.072 | 0.170 | 0.0040 |

The ribbed structure of FIG. 13 can be laminated to webs of other materials. For example, FIG. 14 shows the lamination of a film 78 of thermoplastic resin to the tops of the ribs 74 and 76 immediately after heat softening the film and the tops of the ribs, moving in the direction indicated, with a heat source such as burner 80. Such a laminate generally has a bulk density less than 35 percent of the resin(s) with which it is made. A different web of material, made of plastic, metal, cloth, wood or paper, can be laminated to the ribs or the exterior of either film 72 or film 78 after application of a suitable adhesive, if necessary. Pressure can be applied after lamination to strengthen the bond between lamina, such as by passing the resultant laminate composed of ribbed structure and layer(s) of web material between the nip of a pair of rotating rolls spaced apart slightly less than the thickness of the laminate. In place of the burner 80, a freshly extruded film of thermoplastic resin can be laminated to the tops of ribs 74 and 76 by the application of pressure alone.

The ribs 74 and 76 of the ribbed structure are uniplanar and can be interconnected to form a network of many different patterns of polygonal shapes, such as rectangles, triangles, or hexagons, or of curvilinear shapes, such as circles, instead of the pattern of squares shown in FIG. 13.

In FIG. 15 is shown a container blank 90 from which a carton such as container 2 of FIG. 1 can be made except that tabs 48 are present in place of end-strips 26 and 28 of FIG. 1. The pattern of intersecting strips 12 in the container blank 90 is the same as the pattern in the corresponding faces of the container of FIG. 1. The blank is scored along dashed lines 92 in the same manner that paper-based packaging materials are scored for container erection. The container blank 90 is folded along the score lines 92 and the edges 94 and 96 are secured together in perpendicular abutting relationship, without overlap, by a suitable adhesive or by localized melting of the plastic along these edges by a suitable heat source, then immediate joining of the edges to effect a heat bond thereof. The resultant container resembles container 2 of FIG. 1 with the dashed lines 92 and the seams between the edges 94 and 96 corresponding to the creases 14 in FIG. 1. The tabs 48 are bent to extend into the openings at each end of the container and then locally heated to a temperature at which the tabs will remain in the bent position; this heat treatment is called heat setting. Heat setting can also be applied to creases 14 to counteract the tendency of the creases to unfold.

Use of tabs such as tabs 48, made of ribbed structure, is not limited to containers having the high degree of apertures hereinbefore described, although such containers are preferred. The containers need only have one or more article-access opening as desired, which may be of such shape as to enable the article to be gripped for withdrawal through an opening. Alternatively, the container may have one or more apertures, such as apertures 16, adjacent an article-access opening to provide for gripping of the article.

The container blank 90 of FIG. 15 is made from the ribbed structure of FIG. 14 with the films 72 and 78 of the ribbed structure being indicated by number and with the ribs 74 and 76 being shown as short vertical lines extending from film 72 to film 78.

The container blank 90 is formed from a continuous web of ribbed structure such as shown in FIG. 13 in which the apertures 16 are formed in the web as it is molded or in a subsequent operation. The second film 78 can be laminated to the tops of the ribs 74 and 76 at any point desired after the formation of the web and the apertures formed in this second film in a subsequent operation.

Apparatus for continuously molding ribbed structure such as of FIG. 13 is shown in FIG. 16. In this figure, an extruder 100 is equipped with a hopper 102 for receiving thermoplastic resin and melting it under pressure. A die 104 receives the pressurized molten resin through its rear (hidden) side from the extruder and passes the resin along a path 106 which terminates in an outlet in pressure-seal relation with a rotating patterned roll 108 and directs the resin substantially free of pressure drop and in the absence of air into the pattern of the roll. The roll 108 continuously moves the molten resin away from the outlet of path 106, thereby forming a continuous molded web 110 having a pattern which is complementary to that of the roll. The web 110 is chilled by a flume or water spray 112, and after sufficient contact with the roll 108 which is internally cooled, the cooled web is removed from the roll by take-off rolls 114 aided by a stripper roll 116, and, optionally, mold release agent applied by spray nozzles 118 to the surface of the roll prior to passage under die 104. Longitudinal dividing or trimming of web 110 is accomplished, if desired, by one or more blades 120 positioned between the take-off rolls 114 and reel 121.

To further describe the die 104 and patterned roll 108 which comprise the molding apparatus, FIG. 17 shows one embodiment in which die 104 contains a cavity 124 serving as path 106 (FIG. 16) and which is supplied with molten thermoplastic resin 126 through inlet pipe 127 by extruder 100. Cavity 124 terminates in a slot-shaped outlet 128 extending across the surface of roll 108. The rearward and forward edges of outlet 128 are defined by a die plate 130 and a doctor blade 132, each adjustably spaced from roll 108 and secured to die 104 by bolts 134 extending through slots 136. The pressure upon the molten resin 126 in the cavity forces the resin through outlet 128 and into the roll pattern represented by transverse grooves 138 (enlarged in spacing and width for clarity) and circumferential intersecting grooves 139. The cavity 124 and outlet 128 are substantially free of constriction so that the pressure on the resin at the surface of roll 108 is substantially the same as the pressure on the resin in cavity 124.

The grooves 138 and 139 mold one surface of the web 110. The opposite surface of the web is formed by doctor blade 132 which is adjustably spaced from roll 108 to give the web thickness desired. Die 104 is heated to a temperature above the resin melting temperature of the particular resin being used, by electrical heating elements 140 extending into corresponding wells in the die. The resin molting temperature is the minimum temperature at which a fresh sample of resin leaves a molten trail as it moved slowly across a heated metal surface. This is also sometimes called the stick temperature.

Doctor blade 132 is heated by an electrical heating element 141 usually to a temperature which is equal to or greater than the temperature maintained by die 104. The outer face 143 of the doctor blade departs sharply from the path of web 110 so as to avoid sticking of the web to the hot doctor blade. Roll 108 is cooled to a temperature which is at least about 10° C. less than the melting temperature of the resin being molded, such as by passing a cooling medium through an interior passage 109.

In FIG. 18 essentially the same equipment arrangement as in FIG. 17 is used except that slot-shaped outlet 128 includes a wedge-shaped passage 200 extending in the direction of rotation of roll 108. The wedge-shape of the passage 200 is formed by doctor blade 132 having a slant surface 202 facing the roll 108. Movement of the surface of roll 108 past the opening 128 drags molten resin into the passage 200 wherein the flowing resin is forced into the pattern on roll 108. This drag flow pressure created in the passage 200 at the surface of the roll augments the pressure on the resin within cavity 124 of the die.

The molding apparatus of FIGS. 17 and 18 can be provided with water spray 112 and mold release spray nozzles 118 as shown in FIG. 16.

A pressure-seal relation between the outlet 128 for the molten thermoplastic resin and roll 108 is maintained so that the pressure on the resin in cavity 124 and the drag flow pressure, when the apparatus of FIG. 18 is employed, are available to force the resin into the pattern of roll 108 on a continuous and high speed of production basis. The pressure-seal relation is obtained, in part, by adjusting the doctor blade 132 to constrict the flow space for the resin as it leaves outlet 128 and by having a sufficient rate of web formation for the viscosity of the particular resin being molded to prevent back flow under the die plate 130 which is generally spaced 2 to 10 mils from the surface of roll 108.

FIG. 19 shows means for laterally confining the molten thermoplastic resin as it leaves opening 128 so as to complete the pressure-seal relation. In FIG. 19, the doctor blade 132 is shown in operative position and provided with heating element 141. The lateral surface of the roll 108 is provided with a pattern consisting of (a) transverse grooves 138 and circumferential grooves 139, terminating at shoulders 160 formed between the surface of the roll and cylindrical ends 162 of reduced diameter extending from each end of the roll and (b) raised areas 164. The molten resin from cavity 124 is molded into a web which extends entirely across the roll pattern. Further sideways flow of the resin, however, is prevented by a pair of end plates 166 adjustably spaced from roll 108 by bolts 168 passing through slots (not shown) in the end plates and tightened into die 104. The end plates 166 each lie close to the shoulders 160 and have a lower arcuate surface lying close to the corresponding surface of cylindrical ends 162. This closed spacing, on the order of several mils, permits a small amount of molten resin to enter the tortuous path around shoulders 160 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 166 and roll 108. The end plates 166 also form the lateral sides for cavity 124 and the die outlet 128 which is coextensive therewith.

Means can also be provided for changing the spacing between the die 104 and the roll 108 to compensate for pressure fluctuations caused by extruder 100 so as to maintain a constant force on the resin entering the roll pattern. Exemplary of such means is the pivotal mounting of die 104 about a stub shaft 170 which is on center with the feed line between extruder 100 and the die, and providing a lever arm 172 having the desired weight 174 suspended therefrom as shown in FIG. 16. Excessive molding pressure is relieved by the die 104 rotating away from roll 108. Upon return of the pressure to normal, weight 174 restores the die 104 to its former position to produce web of the desired thickness.

To fill rib patterns in the surface of the roll rotating at a given speed, not only must the pressure on the resin and its volume be sufficient, but the pressure must also be supplied for sufficient duration to cause the resin to flow into the pattern. To accomplish this, it is preferred, where possible depending on the pattern, to have the width of outlet 128 in the direction of rotation of roll 108 greater than at least one repeat unit in the pattern.

In operation, the roll 108 is rotated and molten thermoplastic resin is forced into the pattern of the roll. Molten resin which is contiguous with the surface of the roll and molten resin within the rib pattern is formed into a film by doctor blade 132. The resin is cooled and removed from the roll as a continuous, patterned web, with the rib pattern being complementary to that of the pattern in the roll 108 and consisting of a plurality of longitudinally extending ribs corresponding to grooves 139 and transversely extending ribs corresponding to grooves 138 and areas of thin film corresponding to raised areas 164. The thin film corresponding to raised areas 164 is subsequently removed such as by cutting to yield apertures 16 of the container blank. A film such as film 78 of FIG. 14 can be laminated to the tops of the ribs and apertures 16 formed in it in the same or different cutting operation. Alternatively, the doctor blade 132 can be maintained in contact with the surface of raised areas 164, which are elevated above the adjacent areas by an amount equal to the thickness of film 72 whereby no film is formed over raised areas 164 and the resultant web will already have the apertures 16 formed therein. A still further alternative is to have the roll pattern and thus the web pattern consist entirely of a network of ribs and selectively cutting out portions thereof to form apertures 16. In any of these alternatives, the cut-out resin is recyclable to extruder 100.

Details illustrating the manufacture of a web such as web 110 are as follows: The patterned roll has a pattern in its surface consisting of grooves 0.010 inch wide x 0.050 inch deep running parallel to and perpendicular to the direction of rotation of the roll to form squares measuring about ⅛ inch on a side and areas measuring 2 inches x 3 inches in which no grooves are present and spaced ⅜ inch apart in all directions. The roll is maintained at a temperature of about 80° C .and is rotated at a surface speed of about 20 ft./min. Polyethylene is forced at 275° C. and at a pressure of about 250 p.s.i.g. into the pattern of the roll from a pivotally mounted die having its outlet 128 and doctor blade 132 maintained about 0.004 inch from the roll during operation by a weight acting through a 30 inch lever arm. No mold release agent is used. The resultant web consists of continuous film measuring about 0.004 inch in thickness and having integrally molded ribs arranged in a square pattern ⅛ inch on a side, the ribs measuring 0.010 inch wide x 0.050 inch deep and areas of film without ribs and spaced from one another by ⅜ inch.

A laminate is made from the web formed as just described by extruding a 0.004 inch polyethylene film from a film die at 275° C. onto a chill roll operating at 88° C. and forming a 0.056 inch nip with another roll and simultaneously passing the film and web, rib-side towards the film through the nip to thereby force the film against the ribs of the web to form a laminate containing a core of upstanding ribs. The areas of film without ribs and corresponding areas of the laminated film are simultaneously cut-out by rotating blades.

A ribbed structure is made in the same equipment but from 66 nylon instead of polyethylene, by operating the patterned roll at 150° C. and a molding temperature of 270° C. and pressure of 100 p.s.i.g.

The thermoplastic resins which are useful in making containers of the present invention are any of which are extrudable into continuous solid shapes from a heated, molten condition and under relatively high pressures. Examples of suitable thermoplastic resins include polystyrene, high impact polystyrene, ABS resin, the saturated hydrocarbon polymers, such as polyethylene, linear or branched, propylene and copolymers thereof; ionomers such as described in Canadian Patents 674,595 and 713,631, both to R. W. Rees; copolymers of ethylene with an $\alpha,\beta$-unsaturated carboxylic acid such as described in British Patent 963,380 to Du Pont, and blends thereof with saturated hydrocarbon polymers and such blends containing co-crystallized oxide water activated crosslinking agents; halogenated or perhalogenated olefins, such as vinyl chloride polymer and melt fabricable tetrafluoroethylene polymers such as copolymers thereof with hexafluoropropylene, and chlorotrifluoroethylene polymer; polyvinyl acetate and copolymers thereof with saturated hydrocarbon polymers and, optionally, the acid copolymers of British Patent 963,380 to Du Pont; polymers of $\alpha,\beta$-unsaturated carboxylic acid, such as polymethylmethacrylate; the polyamides such as polyhexamethylene adipamide (66 nylon), polyhexamethylene sebacamide (610 nylon), polycaprolactam (6 nylon), copolymers thereof, and blends of the polyamides with acid copolymers, ionomers, and/or saturated hydrocarbon polymers; polyoxymethylene polymer and copolymer; polycarbonate; polyethylene terephthalate.

The particular molding temperatures employed in making ribbed structures of the present invention will depend upon the resin being molded and upon such operating conditions as the speed of the patterned roll 108 and the intricacy of the pattern therein. Typical molding temperatures for some of the thermoplastic resins suitable for use in the present invention are as follows: linear polyethylene 200–250° C.; branched polyethylene 180–190° C.; polypropylene 200–250° C.; polystyrene 240–280° C.; polyvinyl chloride 150–170° C.; and 66 nylon 260–350° C. The heat setting temperature for stabilizing tabs in their bent position extending across the opening(s) of the container are as follows: linear polyethylene 90° C.; polypropylene 100° C.; polystyrene 90° C.; polyvinyl chloride 95° C.; and 66 nylon 170° C.

The wedge-shaped passage 200 can be of any configuration which augments the molding pressure supplied by the extruder. Generally, the passage 200 will take the form of converging surfaces, with the roll pattern forming one of these surfaces. The pressures required on molten thermoplastic resin in cavity 124 can be less than the full extrusion pressure of the extruder, depending upon which resin is employed and upon operating conditions. The pressure in the cavity 124, however, is substantially the same as the pressure on the resin coming into contact with the pattern of the roll surface. When such pressure is insufficient, the drag flow arrangement of FIG. 18 can be used to increase the force present for continuously filling the pattern with molten resin.

Containers of the present invention can be used in combination with film overwraps if desired. One type of such overwrap can be heat shrinkable film which would tightly engage the exterior surfaces of the container after shrinking of the film overwrap. This tight engagement would add to the rigidity of the container already provided by the ribbed structure.

Many apparently widely different embodiments of this invention may be made without departing from the spirit and scope thereof.

What is claimed is:

1. A container comprising a self-sustaining framework of integrally molded strips of thermoplastic resin, the strips defining apertures which constitute at least 65 percent of the total area of the container, with said strips consisting of ribbed structure of a network of intersecting ribs and a film along one surface of said network of ribs, said ribs of said network being integrally molded to each other and to said film, said container having at least one article-access opening defined by said strips and with at least one of said strips defining said opening having at least one tab secured thereto and extending into said opening for retaining articles within said container, with said apertures enabling said articles to be gripped for withdrawal through said article-access opening.

2. The container of claim 1 wherein said network of ribs have a bulk density which is less than 20 percent the actual density of said resin and said ribbed structure has a bulk density which is less than 30 percent of the actual density thereof.

3. The container of claim 1 wherein another film of thermoplastic resin is secured to the opposite surface of said network of ribs.

4. A container comprising a self-sustaining framework of integrally molded strips of thermoplastic resin, said strips consisting of ribbed structure of a network of intersecting ribs and a film along one surface of said network of ribs, said ribs of said network being integrally molded to each other and to said film, with said strips defining apertures which constitute a major proportion of the total area of said container, said container having at least one article-access opening defined by said strips and at least one of said strips defining said opening having at least one tab secured thereto and extending into said opening for retaining articles within said container, with said apertures enabling said articles to be gripped for withdrawal through said article-access opening.

5. The container of claim 4 wherein another film of thermoplastic resin is secured to the opposite surface of said network of ribs.

6. The container of claim 4 wherein said framework has a plurality of faces and at least one pair of adjacent said faces have a longitudinal joint therebetween.

References Cited

UNITED STATES PATENTS

| | | | |
|---|---|---|---|
| 2,287,495 | 6/1942 | Moyers | 206—45.34 |
| 2,879,886 | 3/1959 | Crane | 206—45.33 |
| 2,918,204 | 12/1959 | Butterfield | 206—45.31 |
| 3,141,913 | 7/1964 | Edwards. | |
| 3,164,298 | 1/1965 | Repko | 221—311 |
| 3,168,887 | 2/1965 | Bodell | 150—0.5 |

WILLIAM T. DIXSON, JR., Primary Examiner

U.S. Cl. X.R.

150—0.5; 206—65; 221—311